Patented July 5, 1949

2,475,023

UNITED STATES PATENT OFFICE 2,475,023

APPARATUS FOR DETECTING DILUTION OR COMMINGLING OF SUBSTANCES

Henry L. Grimes, Winchester, Mass.

Application May 14, 1947, Serial No. 747,922

6 Claims. (Cl. 177—311)

This application is a continuation in part of my prior application Serial No. 591,715, filed May 3, 1945, now abandoned.

The invention relates to a device for detecting dilution or commingling of substances, and is particularly concerned with an improved electronic-type detector which, for example, may serve to give a warning to an aircraft pilot or other operator of the presence in engine fuel of harmful quantities of water or other fluids affecting the combustible properties of the fuel.

An object of the invention is to provide an effective and dependable detector or sensing apparatus which will give a visual and/or audible indication to an operator of the condition of liquid fuel or other fluid flowing through a conduit or passage.

Another object is to provide a device of the type specified utilizing a probe or the like which is affected by the different specific resistances of different substances, the probe being interposed in a D. C. electric circuit unusually sensitive to any change in conductance and embodying means whereby the change is indicated by a suitable signal.

Another object is to provide an electronic device for detecting in a fluid such as gasoline having a given specific resistance the presence of another fluid such as water having a different specific resistance, the device being so constructed and arranged and capable of utilizing voltages so low as to avoid any fire or explosion hazard.

A further object is to provide a device for detecting dilution or commingling of substances utilizing a probe and thermionic tube circuit of a dependable nature and which at the same time is relatively inexpensive and will accommodate itself to a wide variety of installation conditions.

The foregoing and other objects and advantages will become apparent in view of the following description taken in conjunction with the drawings, wherein.

Figure 1:
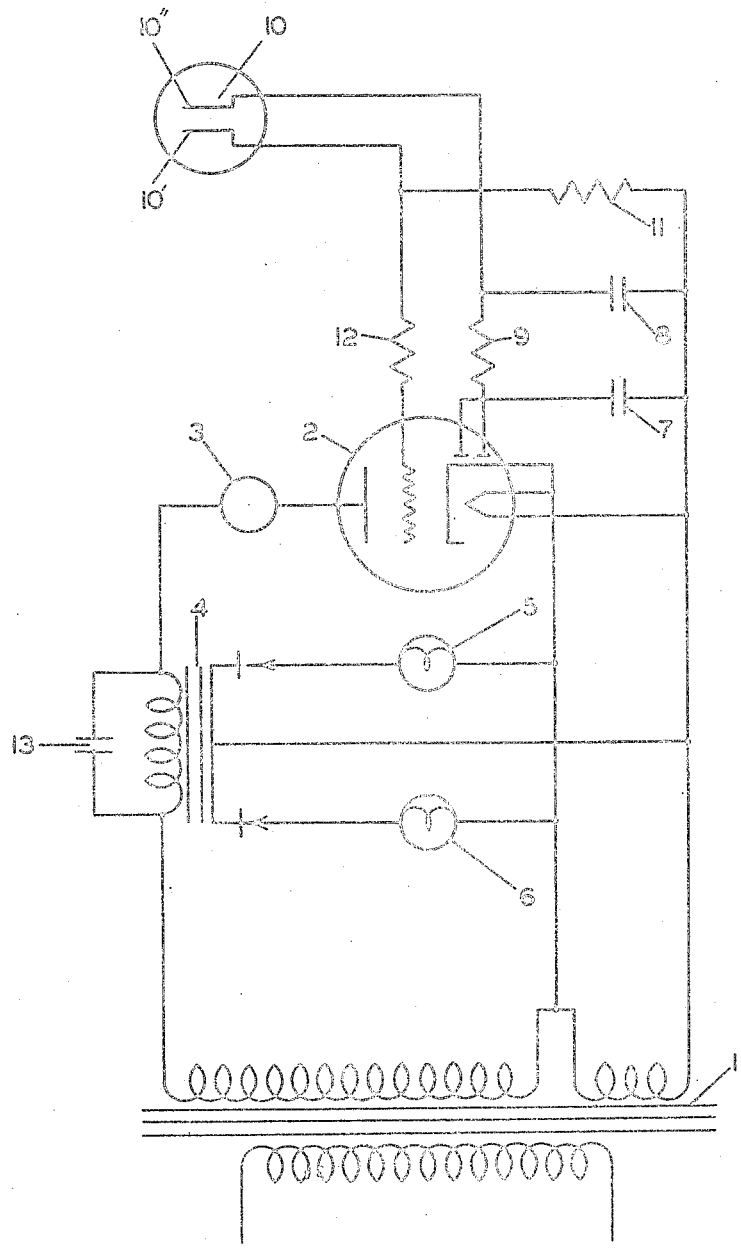
Figure 1 is a diagrammatic representation of apparatus in accordance with the invention.

The device consists of a power transformer 1, vacuum tube 2, with its associated circuit, an indicating milliammeter 3, and a relay 4 which actuates green and red panel lamps 5 and 6. A resistor-capacitor network composed of two capacitors 7 and 8 and the interconnected resistor 9 enables the use of a rather long connecting line between the instrument and the probe 10 and insures reliable operation.

The power transformer 1 supplies for example 150 volts A. C. to the plate circuit of the tube 2, and 6.3 volts A. C. to the heater of the tube 2. This 6.3 volts A. C. source is also used on the diode portion of the tube to provide a source of D. C. bias for the tube. The R. C. network composed of the two capacitors 7 and 8 and the interconnected resistor 9 filters the rectified bias voltage in addition to eliminating capacity effect of long probe cables.

The resistor 11 is the grid-cathode input resistor to establish a fixed grid bias controlling tube emission under open circuit conditions at the probe. The resistor 12 directly in the grid lead serves to limit grid current and to partially isolate the grid from external effects.

The plate circuit relay 4 has single pole, double throw contacts capable of handling several amperes of current; it is by-passed through a condenser 13 to avoid chatter and to raise the D. C. voltage across the relay.

The negative grid bias voltage is connected to the grid of the tube through the probe 10, which normally constitutes an open circuit. The normal bias on the tube is considerably less negative than the bias imposed when the probe circuit is closed.

Figure 2:
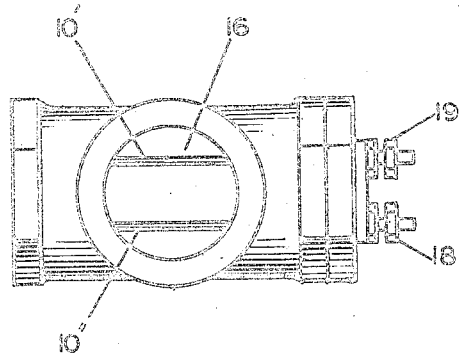
Figure 2 is a top plan view of the probe housing or chamber.
Figure 3:
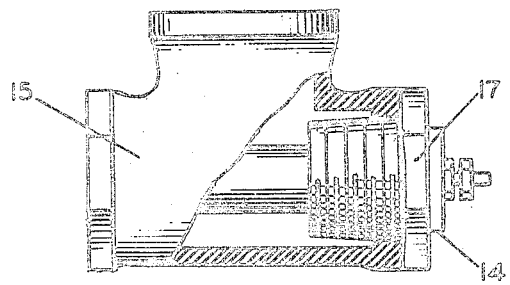
Figure 3 is a view in elevation of the probe chamber, partly broken away to show the probe therein.
Figure 4A:
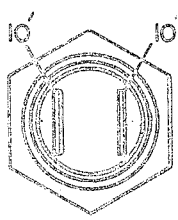
Figures 4, 4A and 4B are views in side and opposite end elevation, respectively, of a probe which may be used in the circuit of Figure 1.
Figure 4:
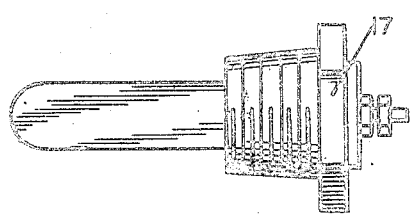
Figure 4B:
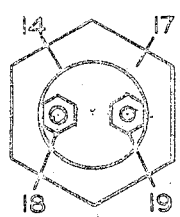

In Figures 2 and 3 the probe 10 and its elements 10' and 10" is shown in its housing 15 which is open at the top at 16 and at one end for fluid flow. The positive and negative elements of the probe are indicated at 10' and 10" mounted in an insulating plug 14 and shown in Figures 1 and 4A, the said elements being secured to an end plug 17 as best shown in Figures 4 and 4B and provided with terminals 18 and 19.

Figure 5:
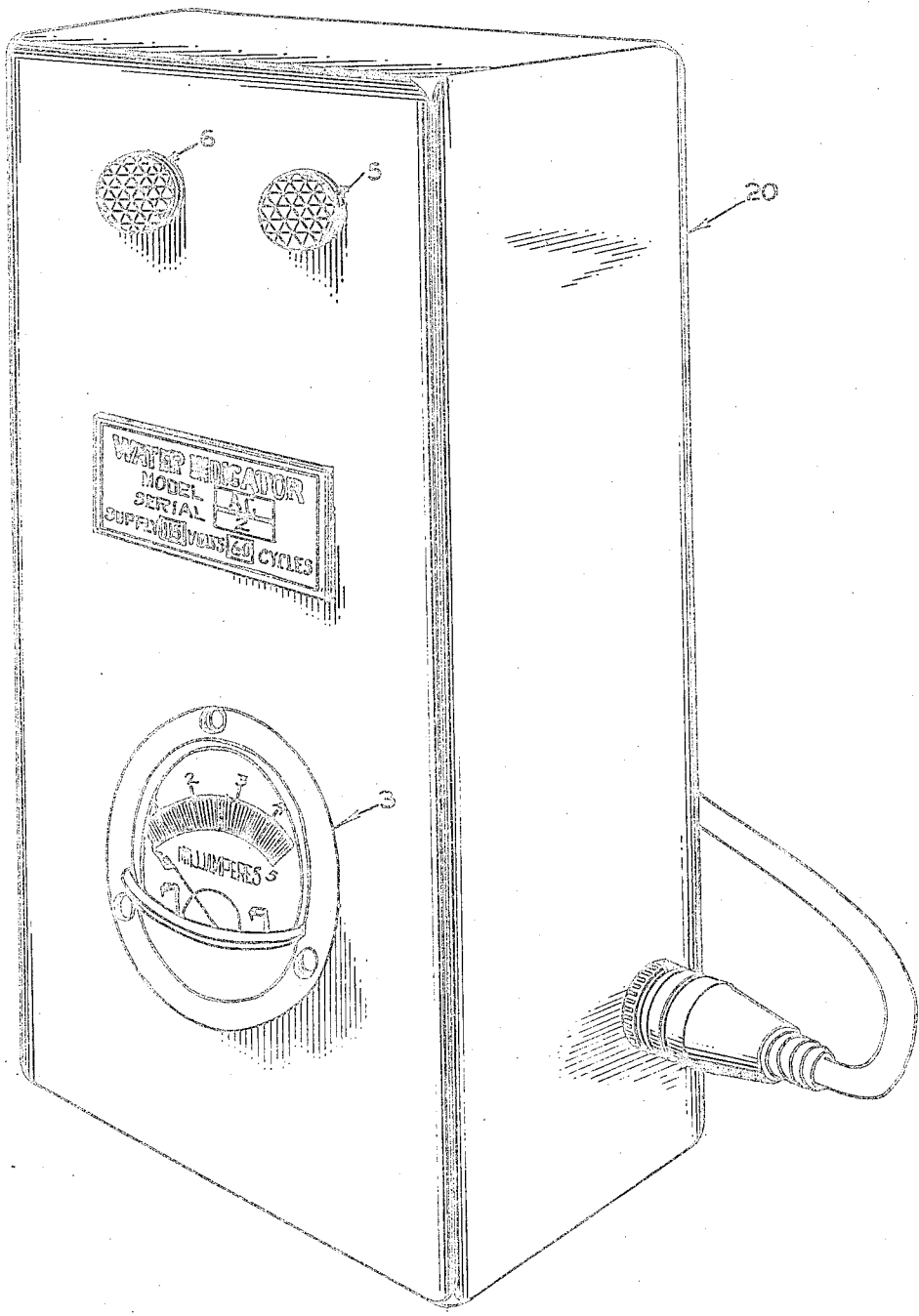
Figure 5 is a perspective view of the apparatus as it appears when assembled in the housing or casing adapted therefor.

Figure 5 shows the unit in its commercial form; it is mounted in a housing or case 20, the milliammeter 3 and red and green signal lights 5 and 6 being exposed on the face of the housing.

Operation

A change in the conductivity of the substance being sampled by the probe results in a change in the grid bias applied to the vacuum tube. Consequently, the plate current changes, producing a corresponding comparative change in the reading on the indicating milliammeter, and in cases where substances pass a critical conductance, producing relay action which extinguishes the green lamp and illuminates the red lamp. Operation of the relay may also be employed to give an audible signal.

The initial bias on the grid being very small, maximum plate current exists, the relay 4 is energized, the milliammeter 3 reads or indicates the value of the plate current; the probe circuit to the grid being open, the green lamp is illuminated.

A change in the conductivity of the substance being probed, whether it be gasoline or lumber being dried in a kiln by way of examples, will result in a change in the grid bias which will change the plate current. In the case of gasoline mixed with water the plate current goes from maximum to minimum. In the case of lumber being dried in a kiln, the plate current goes from minimum to maximum. The red lamp 6 is illuminated at minimum plate current and the green lamp 5 is illuminated at maximum plate current. Interpolations between minimum and maximum plate currents are read from the indicating milliammeter 3. These interpolations for instance would apprise a kiln operator in a furniture manufacturing plant when the charge of lumber in the kiln is ready to be removed.

It should be noted that when the unit is first plugged into the source of power supply, the red lamp 6 will immediately be illuminated, and the milliammeter will read zero. When the tube has warmed up, the milliammeter will start going up scale provided the probe circuit to the grid is open or is in intimate contact with a substance of low conductivity. After a few seconds the milliammeter will read full plate current. The relay will pull in when it is slightly more than half-scale, switching off the red lamp and switching on the green lamp. The unit is now ready for operation.

The instrument may be remotely located and connected to the probe by means of an electrical cable. The tube input circuit contains a filter network, consisting of a resistor-capacitor network composed of two capacitors 7 and 8 and the inter-connected resistor 9, enabling the use of a rather long line between the instrument and the probe. It also insures reliable operation.

Tests have been made with methyl alcohol, kerosene, amyl alcohol, benzine, ethyl alcohol, ordinary motor gasoline 72 octane, and aviation gasoline 93 octane. All tests have shown conclusively when pure fluid was passing through the plates of the probe and when water passed through the plates of the probe with the fluid.

The probe may be designed to meet conditions of use and installation. Thus in testing certain substances or materials the probe may take the form of spaced conducting elements adapted to move over or through the substance or on opposed surfaces of the material.

It will also be understood that parts may be substituted and re-arranged in the respective circuits as well as changes made in construction and design within the scope of the invention as defined by the appended claims.

What I claim as new is:

1. Apparatus for detecting variations in the electrical conductive properties of fluids, comprising a primary electric circuit, a source of electrical energy such as a transformer, a rectifying circuit including a vacuum tube having a grid circuit, a plate circuit and a source of direct current for the grid circuit, a probe in said primary circuit in series with the grid circuit of said tube, said probe having spaced conductive elements adapted to be located in the fluid so that changes in the conductive properties of the fluid result in a change in the resistance of the primary circuit, a signal circuit including a relay and a relay coil connected into the plate circuit, and a capacitor connected across the coil providing a low-resistance path for the alternating current in the plate circuit, the direct current component in the plate circuit operating the relay upon attaining a value determined by the resistance in the primary circuit.

2. Apparatus for detecting in a substance having a given specific resistance the presence of another substance having a different specific resistance including a primary circuit, a rectifying circuit including a vacuum tube having a grid and associated grid circuit and a plate and associated plate circuit energized from a source of power, a probe in series with said grid circuit, said probe having spaced conductive elements adapted to be located in contact with the substance undergoing test so that changes in the conductive properties of the substances result in a change in the conductance of the primary circuit, a signal circuit including a relay and a relay coil connected into the plate circuit and a capacitor connected across the coil providing a low resistance path for the alternating current in the plate circuit, the direct current component in the plate circuit operating the relay upon attaining a value determined by the resistance of the primary circuit, and means for compensating for capacity effect of long lines connecting instrument probe including a resistor-capacitor network for insuring reliable operation.

3. Apparatus for detecting in a substance having a given specific resistance the presence of another substance having a different resistance including a primary circuit, a rectifying circuit including a vacuum tube having a grid and associated grid circuit and a plate and associated plate circuit energized from a source of power, a probe in series with said grid circuit, said probe having spaced conductive elements adapted to be located in contact with the substance undergoing test so that changes in the conductive properties of the substances result in a change in the conductance of the primary circuit, a signal circuit including a relay and a relay coil connected into the plate circuit and a capacitor connected across the coil providing a low resistance path for the alternating current in the plate circuit, the direct current component in the plate circuit operating the relay upon attaining a value determined by the resistance of the primary circuit, means for compensating for capacity effect of long lines connecting instrument probe including a resistor-capacitor network which insures reliable operation, said relay coil capacitor functioning to assure positive operation of the relay by the direct current component of the plate circuit current by bleeding off the alternating current component of the plate circuit current through said low resistance path in parallel with the said relay coil.

4. Apparatus for detecting in a substance having a given specific resistance the presence of another substance having a different specific resistance including a primary circuit, a rectifying circuit including a vacuum tube having a grid and associated grid circuit and a plate and associated plate circuit energized from a source of power, a probe in series with said grid circuit, said probe having spaced conductive elements adapted to be located in contact with the substance undergoing test so that changes in the conductive properties of the substances result in a change in the conductance of the primary circuit, a signal circuit including a relay and a relay coil connected into the plate circuit and a capacitor connected across the coil providing a low resistance path for the alternating current in the plate circuit, the direct current component in the plate circuit operating the relay upon attaining a value determined by the resistance of the primary circuit, means for compensating for capacity effect of long lines connecting the instrument probe including a resistor-capacitor network which insures reliable operation, said relay coil capacitor functioning to assure positive operation of the relay by the direct current component of the plate circuit current by bleeding off the alternating current component of the plate circuit current through said low resistance path in parallel with said relay coil, and means to determine interpolative readings of the apparatus including a milliammeter connected in the plate circuit in series with the relay coil.

5. Apparatus for detecting in a substance having a given specific resistance the presence of another substance having a different specific resistance including a primary circuit, a rectifying circuit including a vacuum tube having a grid and associated grid circuit and a plate and associated plate circuit energized from a source of power, a probe in series with said grid circuit, said probe comprising a pair of spaced conductive elements adapted to be located in contact with the substance undergoing test so that changes in the conductive properties of the substances result in a change in the conductance of the primary circuit, a signal circuit including a relay and a relay coil connected into the plate circuit and a capacitor connected across the coil providing a low resistance path for the alternating current in the plate circuit, the direct current component in the plate circuit operating the relay upon attaining a value determined by the resistance of the primary circuit, means for compensating for capacity effect of long lines connecting the instrument probe including a resistor-capacitor network which insures reliable operation, said relay coil capacitor functioning to assure positive operation of the relay by the direct current component of the plate circuit current by bleeding off the alternating current component of the plate circuit current through said low resistance path in parallel with said relay coil, means to determine interpolative readings of the apparatus including a milliammeter connected in the plate circuit in series with the relay coil, said relay being responsive to direct currents of a given magnitude.

6. Apparatus for detecting in a substance having a given specific resistance the presence of another substance having a different specific resistance including a primary circuit, a rectifying circuit including a vacuum tube having a grid and associated grid circuit and a plate and associated plated circuit energized from a source of power, a probe in series with said grid circuit, said probe comprising a pair of spaced conductive elements adapted to be located in contact with the substance undergoing test so that changes in the conductive properties of the substances result in a change in the conductance of the primary circuit, a signal circuit including a relay and a relay coil connected into the plate circuit and a capacitor connected across the coil providing a low resistance path for the alternating current in the plate circuit, the direct current component in the plate circuit operating the relay upon attaining a value determined by the resistance of the primary circuit, means for compensating for capacity effect of long lines connecting the instrument probe including a resistor-capacitor network arranged to filter the rectified bias voltage, said relay coil capacitor functioning to assure positive operation of the relay by the direct current component of the plate circuit current by bleeding off the alternating current component of the plate circuit current through said low resistance path in parallel with said relay coil, means to determine interpolative readings of the apparatus including a milliammeter connected in the plate circuit in series with the relay coil, said relay operating as the result of changes in the specific resistances of the fluids undergoing test and being responsive to direct currents of a given magnitude, means for utilizing the effect of electrical signals on the relay including a signal circuit connected to the contacts and armature of said relay and having an indicating signal therein, and a source of electrical energy such as a transformer.

HENRY L. GRIMES.

REFERENCES CITED

The following references are of record in the file of this patent:

UNITED STATES PATENTS

| Number | Name | Date |
| --- | --- | --- |
| 2,202,197 | Ewertz | May 28, 1940 |